(12) United States Patent
Pfau

(10) Patent No.: US 12,534,153 B2
(45) Date of Patent: Jan. 27, 2026

(54) RIDER ASSISTANCE SYSTEM FOR A LEAN VEHICLE

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 18/555,840

(22) PCT Filed: Apr. 22, 2022

(86) PCT No.: PCT/IB2022/053765
§ 371 (c)(1),
(2) Date: Oct. 17, 2023

(87) PCT Pub. No.: WO2022/229805
PCT Pub. Date: Nov. 3, 2022

(65) Prior Publication Data
US 2024/0199161 A1 Jun. 20, 2024

(30) Foreign Application Priority Data
Apr. 29, 2021 (JP) .................... 2021-076945

(51) Int. Cl.
*B62J 50/21* (2020.01)
(52) U.S. Cl.
CPC ..................... *B62J 50/21* (2020.02)
(58) Field of Classification Search
CPC ...... B62J 50/21; B60W 30/09; B60W 30/095; B60W 50/14; B60W 2050/143;
(Continued)

(56) References Cited

U.S. PATENT DOCUMENTS

2008/0290618 A1* 11/2008 Yanaka .............. B60G 17/0195
280/6.15
2013/0311075 A1 11/2013 Tran et al.
(Continued)

FOREIGN PATENT DOCUMENTS

EP 3335955 A1 6/2018
JP 2009116882 A 5/2009
(Continued)

OTHER PUBLICATIONS

International Search Report and Written Opinion for Application No. PCT/IB2022/053765 dated Jul. 22, 2022 (8 pages).

*Primary Examiner* — Sze-Hon Kong
(74) *Attorney, Agent, or Firm* — Michael Best & Friedrich LLP

(57) ABSTRACT

The present disclosure provides a controller and a control method for an assistance system that improves a rider's safety.
A controller (20) has an acquisition section (21) and an execution section (22). The acquisition section acquires a positional relationship information regarding a lean vehicle (100) and another vehicle located behind or on a lateral side of the lean vehicle (100). The acquisition section acquires the positional relationship information while the lean vehicle (100) is traveling based on a surrounding environment information that is information about an environment around the lean vehicle. The execution section executes an assistance operation based on the positional relationship information while the lean vehicle (100) is traveling. The assistance operation assists a rider of the lean vehicle (100) in driving the lean vehicle (100). The acquisition section acquires, while the lean vehicle (100) is traveling, a turning posture information of the lean vehicle (100). The execution (Continued)

section changes the assistance operation according to the turning posture information acquired by the acquisition section (21).

8 Claims, 2 Drawing Sheets

(58) Field of Classification Search
CPC ....... B60W 2300/36; B60W 2520/125; B60W 2520/14; B60W 2520/18; B60W 2554/80; B60Y 2200/12
See application file for complete search history.

(56) References Cited

U.S. PATENT DOCUMENTS

| | | | |
|---|---|---|---|
| 2016/0061132 A1* | 3/2016 | Hieda | B60K 31/12 701/110 |
| 2017/0158195 A1* | 6/2017 | Uchida | B60W 30/143 |
| 2017/0327109 A1* | 11/2017 | Watanabe | B60W 50/12 |
| 2020/0216136 A1* | 7/2020 | Hara | B60W 30/12 |
| 2020/0398750 A1* | 12/2020 | Aizawa | B62J 50/22 |
| 2021/0179225 A1* | 6/2021 | Hara | B62D 37/00 |
| 2022/0135165 A1* | 5/2022 | Tamashima | B60W 10/18 701/96 |
| 2022/0161788 A1* | 5/2022 | Tamashima | B60W 30/12 |
| 2022/0169273 A1* | 6/2022 | Horn | B62J 27/00 |
| 2022/0242420 A1* | 8/2022 | Morishima | B60W 40/09 |
| 2022/0315161 A1* | 10/2022 | Katayama | B60T 8/1706 |
| 2023/0306848 A1* | 9/2023 | Nakaoka | H04W 4/025 |

FOREIGN PATENT DOCUMENTS

| | | |
|---|---|---|
| WO | 2017030132 A1 | 2/2017 |
| WO | 2018229566 A1 | 12/2018 |
| WO | 2020041188 A1 | 2/2020 |

* cited by examiner

[FIG. 1]
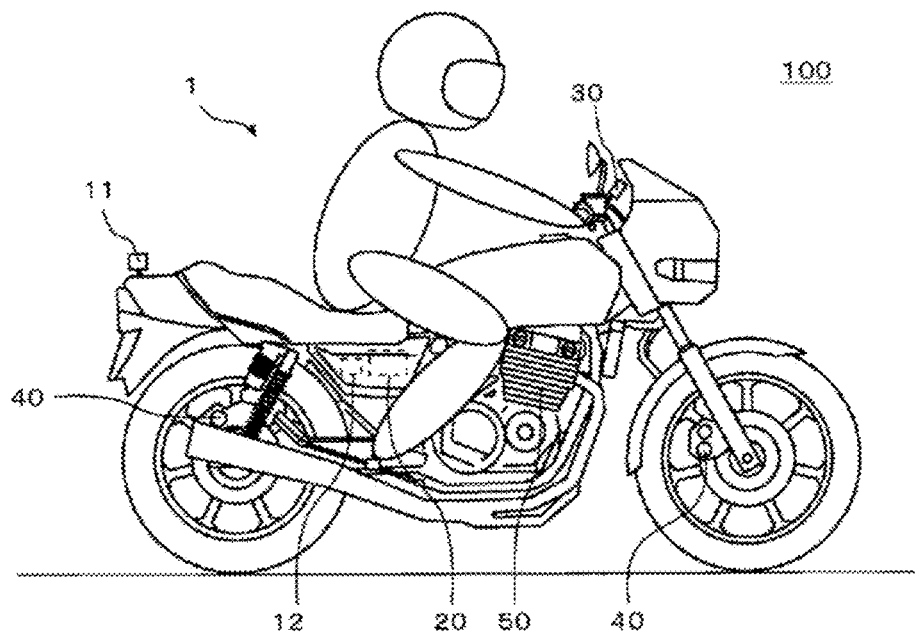
[FIG. 2]
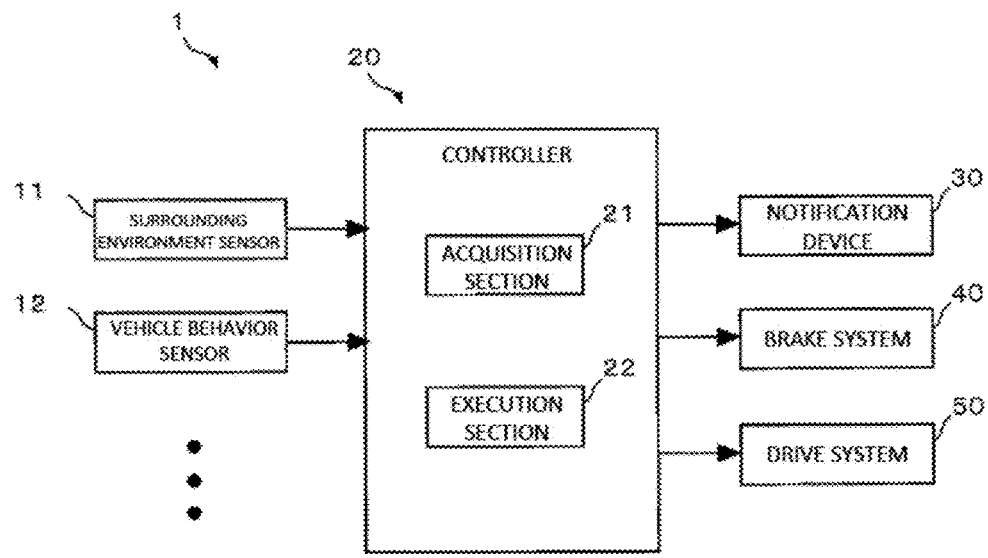

[FIG. 3]
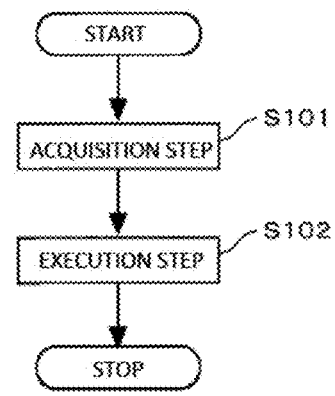

RIDER ASSISTANCE SYSTEM FOR A LEAN VEHICLE

BACKGROUND

The present disclosure relates to a controller for an assistance system and a control method for the assistance system.

Assistance systems are known to assist a rider of a lean vehicle. The assistance system acquires a surrounding environment information of the lean vehicle and executes an assistance operation based on the surrounding environment information. For example, JP 2009-116882 A discloses such an assistance system.

An assistance system for a rider of a lean vehicle acquires a positional relationship information that is information about a relationship regarding a position between the lean vehicle and another vehicle located behind the lean vehicle or on a lateral side of the lean vehicle. The assistance system executes an assistance operation, based on the positional relationship information, to assist the rider in driving the lean vehicle. When the rider drives the lean vehicle, there may be a situation where it is hard for the rider to see the target. In such a situation, the assistance operation may be executed unexpectedly for the rider. For example, the rider concentrates to road conditions in front of the lean vehicle to avoid slipping of the lean vehicle, especially when the lean vehicle is turning a curve or when the rider is banking the lean vehicle. The assistance operation executed unexpectedly may scare the rider, and the rider may not be able to focus on driving.

SUMMARY

The present disclosure addresses the above-described issues. It is an objective of the present disclosure to provide a controller for an assistance system that can improve safety of a rider. It is another objective of the present disclosure to provide a control method for the assistance system that can improve safety of a rider.

Solution to the Issues

As one aspect of the present disclosure, a controller for an assistance system has an acquisition section and an execution section. The acquisition section acquires a positional relationship information regarding a lean vehicle and another vehicle located behind or on a lateral side of the lean vehicle. The acquisition section acquires the positional relationship information while the lean vehicle is traveling based on a surrounding environment information that is information about an environment around the lean vehicle. The execution section executes an assistance operation based on the positional relationship information while the lean vehicle is traveling. The assistance operation assists a rider of the lean vehicle in driving the lean vehicle. The acquisition section acquires, while the lean vehicle is traveling, a turning posture information of the lean vehicle. The execution section changes the assistance operation according to the turning posture information acquired by the acquisition section.

As one aspect of the present disclosure, a controller method for an assistance system includes: acquiring, using an acquisition section of a controller, a positional relationship information regarding a lean vehicle and another vehicle located behind or on a lateral side of the lean vehicle, the acquisition section configured to acquire the positional relationship information while the lean vehicle is traveling based on a surrounding environment information that is information about an environment around the lean vehicle; and executing, using an execution section of the controller, an assistance operation based on the positional relationship information while the lean vehicle is traveling, the assistance operation assisting a rider of the lean vehicle in driving the lean vehicle. The acquisition section acquires, while the lean vehicle is traveling, a turning posture information of the lean vehicle. The execution section changes the assistance operation according to the turning posture information acquired by the acquisition section.

According to the controller and the control method of the present disclosure, the acquisition section acquires a positional relationship information regarding a lean vehicle and another vehicle located behind or on a lateral side of the lean vehicle. The acquisition section acquires the positional relationship information while the lean vehicle is traveling based on a surrounding environment information that is information about an environment around the lean vehicle. The execution section executes an assistance operation based on the positional relationship information while the lean vehicle is traveling. The assistance operation assists a rider of the lean vehicle in driving the lean vehicle. The acquisition section acquires, while the lean vehicle is traveling, a turning posture information of the lean vehicle. The execution section changes the assistance operation according to the turning posture information acquired by the acquisition section. According to the present disclosure, the assistance operation can be prevented from being executed unexpectedly and scaring the rider when the rider is focusing on road conditions in front of the lean vehicle while banking the lean vehicle. Therefore, the rider can focus on driving, and safety of the rider can be improved.

BRIEF DESCRIPTION OF THE DRAWINGS

FIG. 1 is a view illustrating a mounted state of an assistance system according to one embodiment of the present disclosure to a lean vehicle.

FIG. 2 is a diagram illustrating a system configuration of the assistance system according to one embodiment of the present disclosure.

FIG. 3 is a flow chart illustrating operations executed by a controller for the assistance system according to one embodiment of the present disclosure.

DETAILED DESCRIPTION

A description will hereinafter be made on a controller and a control method according to the present disclosure with reference to the drawings.

A configuration, operation, and the like, which will be described below, merely constitute one example. The controller and the control method according to the present disclosure are not limited to a case with such a configuration, such operation, and the like.

The present disclosure will be described hereafter as a controller and a control method are applied to two-wheel vehicles. However, a controller and a control method according to the present disclosure may be applied to lean vehicles other than two-wheel vehicles. A lean vehicle includes any vehicles that leans in a turning direction when the vehicle turns. For example, a lean vehicle may be a two-wheel motorcycle, a three-wheel motorcycle, or a bicycle. For example, a motorcycle may be a vehicle that travels with power generated by an engine, a vehicle that travels with power generated by an electric motor. A motorcycle may be a motorbike, a scooter, or an electric scooter. A bicycle may be any vehicles that travels with power generated by a rider in a manner that the rider steps on a pedal. A bicycle may be a regular bicycle, a power-assisted bicycle, or an electric bicycle.

The same or similar description will appropriately be simplified or will not be made below. In the drawings, the same or similar portions will be denoted by the same reference sign or will not be denoted by a reference sign. A detailed structure will appropriately be illustrated in a simplified manner or will not be illustrated.

An assistance system for a rider according to an embodiment will be described hereafter.

<Configuration of Assistance System>

A configuration of the assistance system for a rider according to the present embodiment will be described hereafter.

FIG. 1 is a view illustrating a mounted state of the assistance system according to the embodiment of the present disclosure to a lean vehicle. FIG. 2 is a diagram illustrating a system configuration of the assistance system according to the embodiment of the present disclosure.

As illustrated in FIG. 1 and FIG. 2, a assistance system 1 is mounted to a lean vehicle 100. For example, the assistance system 1 includes a surrounding environment sensor 11, a vehicle behavior sensor 12, a controller (ECU) 20, a notification device 30, a brake system 40, and a drive system 50.

The assistance system 1 has the controller 20 that executes an assistance operation that assists a rider in driving the lean vehicle 100 while the lean vehicle 100 is traveling. The controller 20, when executing the assistance operation, uses information obtained by the surrounding environment sensor 11 and information obtained by the vehicle behavior sensor 12. The controller 20 executes the assistance operation by outputting control commands to various devices (for example, the notification device 30, the brake system 40, the drive system 50, and the like). When necessary, the controller 20 receives detection results from various sensors (not illustrated) for detecting other types of information (for example, information on an operating state of the brake system 40 by the rider, information on an operating state of the drive system 50 by the rider, and the like). Each component of the assistance system 1 may exclusively be used for the assistance system 1 or may be shared with another system.

The surrounding environment sensor 11 detects a surrounding environment information that is information about an environment around the lean vehicle 100. For example, the surrounding environment information is information about an environment behind or on a lateral side of the lean vehicle 100. More specifically, the surrounding environment information may be information about an environment on back-right or back-left of the rider of the lean vehicle 100. The surrounding environment information includes information about a distance between the lean vehicle 100 and a target located behind of the lean vehicle 100 or located on the lateral side of the lean vehicle 100. The surrounding environment information also includes information about an orientation of the target with respect to the lean vehicle 100. The surrounding environment sensor 11 is, e.g., a radar, a Lidar sensor, an ultrasonic sensor, or a camera.

The vehicle behavior sensor 12 detects vehicle behavior information of the lean vehicle 100. Examples of the vehicle behavior sensor 12 are a vehicle speed sensor and an inertial measurement unit (IMU). The vehicle speed sensor detects a speed generated to the lean vehicle 100. The vehicle speed sensor may detect another physical quantity that can substantially be converted to the speed generated to the lean vehicle 100. The inertial measurement unit detects accelerations in three axes (a front-rear direction, a vehicle width direction, and a vehicle height direction) and angular velocities in the three axes (a roll angle, a pitch angle, and a yaw angle) generated to the lean vehicle 100. The inertial measurement unit may detect other physical quantities that can substantially be converted to accelerations in three-axes and the angular velocities in three-axes generated to the lean vehicle 100. Alternatively, the inertial measurement unit may partially detect the accelerations in three-axes and the angular velocities in three-axes.

The controller 20 at least includes an acquisition section 21 and an execution section 22. The sections of the controller 20 may collectively be provided in a single casing or may separately be provided in plural casings. In addition, the controller 20 may entirely or partially be constructed of a microcomputer, a microprocessor unit, or the like, may be constructed of one whose firmware and the like can be updated, or may be a program module or the like that is executed by a command from a CPU or the like, for example.

Based on the surrounding environment information detected by the surrounding environment sensor 11, the acquisition section 21 acquires a positional relationship information while the lean vehicle 100 is traveling. The positional relationship information is information about a relationship regarding a position between the lean vehicle 100 and another vehicle traveling behind or on the lateral side of the lean vehicle 100. For example, the positional relationship information is information on a relative position, a relative distance, a relative speed, a relative acceleration, a relative jerk, and the like. The positional relationship information may be information on another physical quantity that can substantially be converted to each of those.

In addition, during the travel of the lean vehicle 100, the acquisition section 21 acquires turning posture information of the lean vehicle 100 based on the vehicle behavior information detected by the vehicle behavior sensor 12. For example, the turning posture information is information on a degree of a bank, a degree of a change rate of the bank, and the like. The turning posture information may be information on another physical quantity that can substantially be converted to each of those. In other words, as the information on the degree of the bank, information on the roll angle, the acceleration in the vehicle width direction, the angular velocity of the yaw angle, or the like may be acquired, for example. In addition, as the information on the degree of the change rate of the bank, information on a change rate of the roll angle, a change rate of the acceleration in the vehicle width direction, a change rate of the angular velocity of the yaw angle, or the like may be acquired, for example.

Based on the positional relationship information acquired by the acquisition section 21, the execution section 22 executes the assistance operation for assisting with driving by the rider of the lean vehicle 100 during the travel. Then, the execution section 22 changes the assistance operation according to the turning posture information acquired by the acquisition section 21. The assistance operation includes a notification operation that generates a warning to the rider. In such a case, the execution section 22 changes the control command to be output to the notification device 30 according to the turning posture information. Alternatively, the assistance operation may be control operation to control the speed, the acceleration, or the jerk generated to the lean vehicle 100. In such a case, the execution section 22 changes the control command to be output to at least one of the brake system 40 and the drive system 50 according to the turning posture information. The control operation may be executed in a state where the rider operates the brake system 40 or the drive system 50. Alternatively, the control operation may be executed in a state where the rider does not operate the brake system 40 or the drive system 50. As the assistance operation, both of the notification operation for the rider and the control operation of the speed, the acceleration, or the jerk generated to the lean vehicle 100 may be executed.

The notification device 30 may notify the rider by using a display (that is, a sensation through a visual organ as a sensory organ), may notify the rider by sound (that is, a sensation through an auditory organ as the sensory organ), may notify the rider by vibration (that is, a sensation through a tactile organ as the sensory organ), or may notify the rider by a combination of those. More specifically, the notification device 30 is a display, a lamp, a speaker, a vibrator, or the like, may be provided to the lean vehicle 100, or may be provided to an accessory such as a helmet or a glove associated with the lean vehicle 100. In addition, the notification device 30 may be constructed of a single output device or may be constructed of plural output devices of the same type or different types. Such plural output devices may be provided integrally or may be provided separately.

The brake system 40 is provided to decelerate the lean vehicle 100. The drive system 50 is used as a power source of the lean vehicle 100 and generates drive power for the lean vehicle 100. The drive system 50 may take on the function of the brake system 40.

As an example, the execution section 22 executes, as the assistance operation, the notification operation to notify the rider of the relative distance of the other vehicle with respect to the lean vehicle 100 or to notify a passing time difference between the lean vehicle 100 and the other vehicle. For example, the acquisition section 21 acquires, as the positional relationship information, information about the relative distance of the other vehicle, which is located behind or on the lateral side of the lean vehicle 100, which respect to the lean vehicle 100. For another example, the acquisition section 21 acquires, as the positional relationship information, information about the passing time difference between the lean vehicle 100 and the other vehicle. Then, the execution section 22 executes the notification operation to notify the rider of the information about the relative distance or the passing time difference. During the notification operation, the relative distance, the passing time difference itself, a rank indicating a degree of the relative distance, and/or the passing time difference may be notified. Additional information such as a model of the other vehicle and the like may be notified in addition to the relative distance and/or the passing time difference. The execution section 22 changes the notification operation according to the turning posture information acquired by the acquisition section 21. The execution section 22 may execute, as the assistance operation, the control operation to control the speed, the acceleration, or the jerk generated to the leaning vehicle 100 so as to adjust the relative distance or the passing time difference. Also, in such a case, the execution section 22 may change the control operation according to the turning posture information acquired by the acquisition section 21.

As an example, the execution section 22 executes, as the assistance operation, the notification operation to notify the rider that the other vehicle is tailgating the lean vehicle 100 aggressively. For example, the acquisition section 21 acquires the positional relationship information meaning that the other vehicle is traveling behind the lean vehicle 100 while the relative distance or the passing time difference is below a threshold and that the relative distance or the passing time difference is being stable over a specified time duration. Then, the execution section 22 executes the notification operation. The notification operation may notify the rider of presence or absence of the other vehicle tailgating the lean vehicle 100 aggressively. The notification operation may notify a state of the other vehicle, e.g., the relative distance, a rank indicating the degree of the relative distance, the passing time difference, a rank indicating the degree of the passing time difference, and/or the model of the other vehicle. The execution section 22 executes various notification operations according to the turning posture information acquired by the acquisition section 21. The execution section 22 may execute, as the assistance operation, the control operation to control the speed, the acceleration, or the jerk generated to the leaning vehicle 100 so as to adjust the relative distance or the passing time difference. In such a case, the execution section 22 executes various control operations according to the turning posture information acquired by the acquisition section 21.

As an example, the execution section 22 executes, as the assistance operation, the notification operation to notify the rider that the other vehicle is located in a blind spot of the lean vehicle 100. For example, the acquisition section 21 acquires the positional relationship information indicating that: the other vehicle is located on the lateral side of the lean vehicle; the other vehicle is located in an area which is possibly a blind spot for the rider; and the relative distance of the other vehicle with respect to the lean vehicle 100 is shorter than a threshold distance. Then, the execution section 22 executes the notification operation in response to the positional relationship information.

The notification operation may notify the rider of presence or absence of the other vehicle located in the blind spot of the lean vehicle 100. The notification operation may notify the rider of various types of information regarding the other vehicle. For example, the information may be about the relative distance, a rank indicating the degree of the relative distance, the relative speed, a rank indicating the degree of the relative speed and a model of the other vehicle. The execution section 22 executes various notification operations according to the turning posture information acquired by the acquisition section 21.

As an example, the execution section 22 executes, as the assistance operation, the notification operation to notify the rider of a possibility of collision that may occur between the lean vehicle 100 and the other vehicle. For example, the acquisition section 21 acquires the positional relationship information meaning that the possibility of collision, which may occur between the lean vehicle 100 and the other vehicle located behind the lean vehicle 100 or located on the lateral side of the lean vehicle 100, exceeds a threshold level. Then, the execution section 22 executes the notification operation. The notification operation may notify the rider of presence or absence of the possibility of collision or a rank indicating a degree of the collision possibility. The notification operation may notify the rider of additional information, e.g., the model of the other vehicle, in addition to presence or absence of the possibility of collision or a rank indicating a degree of the collision possibility. The execution section 22 executes various notification operations according to the turning posture information acquired by the acquisition section 21. The execution section 22 may execute, as the assistance operation, the control operation to control the speed, the acceleration, or the jerk generated to the leaning vehicle 100 so as to reduce the possibility of collision. Also, the execution section 22 may execute various control operations according to the turning posture information acquired by the acquisition section 21.

The execution section 22 does not execute the assistance operation when the turning posture information acquired by the acquiring section 21 means that the degree of banking of the lean vehicle 100 is small. On the other hand, the execution section 22 executes the assistance operation when the turning posture information acquired by the acquiring section 21 means that the degree of banking of the lean vehicle 100 is large. The acquisition section 21 may acquire information about a roll angle, a lateral acceleration in a lateral direction of the lean vehicle, or an angular velocity in a yaw angle. In such a case, the execution section 22 may determine the turning posture information to indicate that the degree of banking of the lean vehicle 100 is small, when the roll angle, the lateral acceleration, or the angular velocity of the yaw angle is below an upper limit value or is maintained below the upper limit value over a specified time duration. Alternatively, the execution section 22 may determine the turning posture information to indicate that the degree of banking of the lean vehicle 100 is large, when the roll angle, the lateral acceleration, or the angular velocity of the yaw angle is greater than an upper limit value or is maintained to be greater than the upper limit value over a specified time duration.

The execution section 22 may execute the assistance operation with a small degree when the turning posture information acquired by the acquiring section 21 means that a degree of banking of the lean vehicle 100 is large. In other words, a degree of the assistance operation when the degree of banking is large is smaller than a degree of the assistance operation when the degree of banking is small. When the notification operation is executed as the assistance operation, the execution section 22 may decrease the degree of the assistance operation by performing the notification with a lower strength so that it is less easy for the rider to perceive the notification. In other words, the execution section 22 decreases the degree of the assistance operation by making the rider less perceive a warning. As another example, when the control operation to control a speed, acceleration, or a jerk of the lean vehicle 100 is executed as the assistance operation, the execution section 22 may decrease the degree of the assistance operation by decreasing an amount of change in the speed, the acceleration, or the jerk of the lean vehicle 100. The acquisition section 21 may acquire information about the roll angle, the lateral acceleration in the lateral direction of the lean vehicle, or the angular velocity of the yaw angle. In such a case, the execution section 22 may determine that the turning posture information acquired by the acquisition section 21 means that the degree of banking of the lean vehicle 100 is large, when the roll angle, the lateral acceleration, or the angular velocity of the yaw angle exceeds a threshold or is exceeding the threshold over a specified time duration. Alternatively, the execution section 22 may determine that the turning posture information acquired by the acquisition section 21 means that the degree of banking of the lean vehicle 100 is small, when the roll angle, the lateral acceleration, or the angular velocity of the yaw angle is below the threshold or is maintained below the threshold over a specified time duration.

The execution section 22 executes the assistance operation when the turning posture information means that an amount of change in the degree of banking of the lean vehicle 100 is small. The execution section 22 does not execute the assistance operation when the turning posture information means that an amount of change in the degree of banking of the lean vehicle 100 is large. The acquisition section 21 may acquire information about a rate of change in the roll angle, a range of change in the lateral acceleration, or a rate of change in the angular velocity of the yaw rate. In such a case, the execution section 22 may determine the turning posture information to mean that the amount of change in the degree of banking is small, when the rate of change in the roll angle, the range of change in the lateral acceleration, or the rate of change in the angular velocity of the yaw rate is smaller than an upper limit value or is maintained to be smaller than the upper limit value over a specified time duration. Alternatively, the execution section 22 may determine the turning posture information to mean that the amount of change in the degree of banking is large, when the rate of change in the roll angle, the range of change in the lateral acceleration, or the rate of change in the angular velocity of the yaw rate is greater than an upper limit value or is maintained to be greater than the upper limit value over a specified time duration.

The execution section 22 may execute the assistance operation with a small degree when the turning posture information acquired by the acquiring section 21 means that the rate of change in the degree of banking of the lean vehicle 100 is large. In other words, a degree of the assistance operation when the rate of change in the degree of banking is large is smaller than a degree of the assistance operation when the rate of change in the degree of banking is small. When the notification operation is executed as the assistance operation, the execution section 22 may decrease the degree of the assistance operation by performing the notification with a lower strength so that it is less easy for the rider to perceive the notification. As another example, when the control operation to control the speed, the acceleration, or the jerk of the lean vehicle 100 is executed as the assistance operation, the execution section 22 may decrease the degree of the assistance operation by decreasing an amount of change in the speed, the acceleration, or the jerk of the lean vehicle 100. The acquisition section 21 may acquire information about a rate of change in the roll angle, the lateral acceleration, or the angular velocity of the yaw angle. In such a case, the execution section 22 may determine that the turning posture information acquired by the acquisition section 21 means that the degree of banking of the lean vehicle 100 is large, when the rate of change in the roll angle, the lateral acceleration, or the angular velocity of the yaw angle exceeds a threshold or is exceeding the threshold over a specified time duration. Alternatively, the execution section 22 may determine that the turning posture information acquired by the acquisition section 21 means that the degree of banking of the lean vehicle 100 is small, when the rate of change in the roll angle, the lateral acceleration, or the angular velocity of the yaw angle is below the threshold or is maintained below the threshold over a specified time duration.

When the notification operation is executed as the assistance operation, the execution section 22 may decrease a strength of the notification so that it is less easy for the rider to perceive the notification. The strength means, e.g., a brightness of the display, a display size, a volume of sound, an amplitude of vibration. Alternatively, the execution section 22 may decrease a cycle of the notification so that it is less easy for the rider to perceive the notification. For example, the execution section 22 decreases a cycle in changing the display, a cycle in changing the volume of sound, or a frequency of vibration. For another example, the execution section 22 may change a way of how to notify the rider so that it is less easy for the rider to perceive the notification. For example, the notification is performed using a display or sound instead of using vibration. The notification device 30 may be changed so that it is less easy for the rider to perceive the notification. For example, the notification device 30 may be attached to a helmet and notify the rider using a display or sound or may be attached to the lean vehicle 100 and notify the rider using a display or sound.

<Operation of Assistance System>

A description will be made on operation of the assistance system according to the embodiment.

FIG. 3 is a chart illustrating an operation flow of the controller in the assistance system according to the embodiment of the present disclosure.

The controller 20 executes the operation flow illustrated in FIG. 3 during the travel of the lean vehicle 100.

(Acquisition Step)

At S101, during the travel of the lean vehicle 100, the acquisition section 21 acquires the positional relationship information based on the surrounding environment information detected by the surrounding environment sensor 11. The positional relationship information is information about a relationship regarding a position between the lean vehicle 100 and the other vehicle that is located behind of the lean vehicle 100 or is located on the lateral side of the lean vehicle 100. In addition, the acquisition section 21 acquires, while the lean vehicle 100 is traveling, the turning posture information of the lean vehicle 100 based on the vehicle behavior information detected by the vehicle behavior sensor 12.

(Execution Step)

At S102, the execution section 22 executes, while the lean vehicle 100 is traveling, the assistance operation based on the positional relationship information acquired by the acquisition section 21. The assistance operation assists the rider in driving the lean vehicle 100. The execution section 22 executes various assistance operations according to the turning posture information acquired by the acquisition section 21.

<Effects of Assistance System>

Effects of the assistance system according to the present embodiment will be described hereafter.

The controller 20 for the assistance system 1 has the acquisition section 21 and the execution section 22. The acquisition section 21 acquires a positional relationship information regarding a lean vehicle 100 and another vehicle located behind or on a lateral side of the lean vehicle 100. The acquisition section 21 acquires the positional relationship information while the lean vehicle 100 is traveling based on the surrounding environment information that is information about the environment around the lean vehicle 100. The execution section 22 executes an assistance operation based on the positional relationship information while the lean vehicle 100 is traveling. The assistance operation assists the rider of the lean vehicle 100 in driving the lean vehicle 100. The acquisition section 21 acquires, while the lean vehicle 100 is traveling, a turning posture information of the lean vehicle 100. The execution section 22 changes the assistance operation according to the turning posture information acquired by the acquisition section 21. According to the present disclosure, the assistance operation can be prevented from being executed unexpectedly and scaring the rider when the rider is focusing on road conditions in front of the lean vehicle while banking the lean vehicle. Therefore, the rider can focus on driving, and safety of the rider can be improved.

Preferably, the execution section 22 executes the assistance operation when the turning posture information acquired by the acquisition section 21 means that the degree of banking of the lean vehicle 100 is small. The execution section 22 does not execute the assistance operation when the turning posture information acquired by the acquisition section 21 means that the degree of banking of the lean vehicle 100 is large. Therefore, safety of the rider can be improved certainly.

Preferably, the execution section 22 executes the assistance operation with the small degree when the turning posture information acquired by the acquiring section 21 means that the degree of banking of the lean vehicle 100 is large. In other words, a degree of the assistance operation when the degree of banking is large is smaller than a degree of the assistance operation when the degree of banking is small. Therefore, safety of the rider can be improved certainly.

Preferably, the execution section 22 executes the assistance operation when the turning posture information acquired by the acquiring section 21 means that the rate of change in the degree of banking of the lean vehicle 100 is small. The execution section 22 does not execute the assistance operation when the turning posture information acquired by the acquiring section 21 means that the rate of change in the degree of banking of the lean vehicle 100 is large. Therefore, safety of the rider can be improved certainly.

Preferably, the execution section 22 may execute the assistance operation with a small degree when the turning posture information acquired by the acquiring section 21 means that the rate of change in the degree of banking of the lean vehicle 100 is large. In other words, a degree of the assistance operation when the rate of change in the degree of banking is large is smaller than a degree of the assistance operation when the rate of change in the degree of banking is small. Therefore, safety of the rider can be improved certainly.

Although the description has been made so far on the embodiment, only a part of the embodiment may be implemented, or a part of the embodiment may be modified to another aspect. In other words, the present disclosure is not limited to the embodiment that has been described.

For example, the description has been made so far on the case where the acquisition section 21 acquires the positional relationship information between the lean vehicle 100 and the other vehicle traveling behind or on the side of the lean vehicle 100 based on the surrounding environment information detected by the surrounding environment sensor 11. However, the acquisition section 21 may acquire the positional relationship information between the lean vehicle 100 and the other vehicle traveling behind or on the side of the lean vehicle 100 by using another means (for example, wireless communication between the lean vehicle 100 and a vehicle located therearound, wireless communication between the lean vehicle 100 and an infrastructure facility located therearound, or the like).

For example, the description has been made so far on the case where the acquisition section 21 acquires the turning posture information of the lean vehicle 100 based on the vehicle behavior information detected by the vehicle behavior sensor 12. However, the acquisition section 21 may acquire the turning posture information of the lean vehicle 100 by using another means (for example, map information with which the turning posture information of the lean vehicle 100 can be estimated, or the like).

REFERENCE SIGNS LIST

1: Assistance system
11: Surrounding environment sensor
12: Vehicle behavior sensor
20: Controller
21: Acquisition section
22: Execution section
30: Notification device
40: Brake system
50: Drive system
100: Lean vehicle

The invention claimed is:

1. A controller (20) for an assistance system (1), the controller (20) configured to:
   acquire a positional relationship information regarding a lean vehicle (100) and another vehicle located behind or on a lateral side of the lean vehicle (100) while the lean vehicle (100) is traveling based on a surrounding environment information that is information about an environment around the lean vehicle (100); and
   execute an assistance operation based on the positional relationship information while the lean vehicle (100) is traveling, the assistance operation assisting a rider of the lean vehicle (100) in driving the lean vehicle (100), wherein
   the assistance operation includes a notification operation that generates a warning to the rider,
   the controller is configured to acquire, while the lean vehicle (100) is traveling, a turning posture information of the lean vehicle (100),
   the controller is configured to execute the notification operation with a small degree when the turning posture information indicates that a degree of banking or a rate of change in the degree of banking of the lean vehicle (100) is large,
   the small degree is a degree smaller than a degree of the notification operation performed when the turning posture information indicates that the degree of banking or the rate of change in the degree of banking of the lean vehicle (100) is small, and
   the controller executes the notification operation with the small degree by making the rider less perceive the warning.

2. The controller (20) according to claim 1, wherein the notification operation includes an operation that notifies the rider of a relative distance of the another vehicle with respect to the lean vehicle (100) or a passing time difference between the another vehicle and the lean vehicle (100).

3. The controller (20) according to claim 1, wherein the notification operation includes an operation that notifies the rider that the another vehicle is tailgating the lean vehicle (100).

4. The controller (20) according to claim 1, wherein the notification operation includes an operation that notifies the rider that the another vehicle is located in a blind spot of the lean vehicle (100).

5. The controller (20) according to claim 1, wherein the notification operation includes an operation that notifies the rider of a possibility of collision between the lean vehicle (100) and the another vehicle.

6. The controller (20) according to claim 1, wherein the assistance operation includes a control operation that controls a speed, acceleration, or a jerk of the lean vehicle (100).

7. The controller (20) according to claim 1, wherein the assistance operation includes a control operation that controls a speed, acceleration, or a jerk of the lean vehicle (100), and
the controller executes the notification operation with the small degree by decreasing a change in the speed, the acceleration, or the jerk.

8. A control method for an assistance system (1), the control method comprising:
   acquiring, using a controller (20), a positional relationship information regarding a lean vehicle (100) and another vehicle located behind or on a lateral side of the lean vehicle (100) to acquire the positional relationship information while the lean vehicle (100) is traveling based on a surrounding environment information that is information about an environment around the lean vehicle (100); and
   executing, using the controller (20), an assistance operation based on the positional relationship information while the lean vehicle (100) is traveling, the assistance operation assisting a rider of the lean vehicle (100) in driving the lean vehicle (100), wherein
   the assistance operation includes a notification operation that generates a warning to the rider,
   the controller is configured to acquire, while the lean vehicle (100) is traveling, a turning posture information of the lean vehicle (100),
   the controller is configured to execute the notification operation with a small degree when the turning posture information indicates that a degree of banking or a rate of change in the degree of banking of the lean vehicle (100) is large,
   the small degree is a degree smaller than a degree of the notification operation performed when the turning posture information indicates that the degree of banking or the rate of change in the degree of banking of the lean vehicle (100) is small, and
   the controller executes the notification operation with the small degree by making the rider less perceive the warning.

* * * * *